April 14, 1970            A. M. VIK            3,506,148

GRAVITY ACTUATED SELF-RIGHTING DUMPER

Filed April 29, 1968            2 Sheets-Sheet 1

INVENTOR.
ALBAM M. VIK
BY
ATTORNEY

April 14, 1970     A. M. VIK     3,506,148

GRAVITY ACTUATED SELF-RIGHTING DUMPER

Filed April 29, 1968     2 Sheets-Sheet 2

INVENTOR.
ALBAM M. VIK
BY
ATTORNEY

United States Patent Office 3,506,148
Patented Apr. 14, 1970

1

3,506,148
GRAVITY ACTUATED SELF-RIGHTING DUMPER
Albam M. Vik, New Brighton, Minn., assignor to Inventors Engineering Inc., Fridley, Minn., a corporation of Minnesota
Filed Apr. 29, 1968, Ser. No. 724,932
Int. Cl. B66f 9/06
U.S. Cl. 214—620          10 Claims

ABSTRACT OF THE DISCLOSURE

A gravity actuated self-righting dumper for containers such as steel and fiber drums and other open-top shipping containers consisting of a supporting framework, a pair of clamp arms, a pair of jaws on the arms for engaging and supporting the load that is to be dumped, a laterally disposed pivot operatively associated between the clamp arms and the supporting framework in a position with respect to the container when mounted between the jaws such that the weight of the container will cause the clamp arms and the container itself to tip forwardly about the pivot thereby dumping the contents of the container. A spring that is connected between the supporting framework and the jaws returns the container to the upright position. A latch mechanism retains the jaws in a horizontal position until released.

The present invention relates to equipment for handling materials and more particularly to a clamp mechanism for lifting and transporting containers then dumping the container by the action of gravity and returning the container to its upright position.

It is frequently necessary to transport the material from one location to another and dump the contents into a container or processing unit. For example, in a machine shop, scrap metal is frequently stored in steel drums. When the drums become full they must be lifted, carried to a dumping station where scrap is collected and thereupon inverted. The same operation must be performed in many industries, such as the chemical industry and food processing industries.

Equipment has been previously designed for holding and dumping containers of this kind but these prior designs have been relatively complicated in construction and have required expensive components such as hydraulic cylinders and an outside power source such as electric or hydraulic power. Moreover, many of these units are relatively slow acting and are therefore time consuming to operate.

Other equipment of the general type described is suited for certain applications but is impractical for use in manufacturing or processing plants for the purpose of lifting and transporting containers such as fiber and steel drums. In particular, it is not well suited to operate in conjunction with fork lift trucks which are in widespread use throughout such plants.

In view of these and other deficiencies of the prior art, it is one object of the present invention to provide an improved clamping and dumping apparatus for articles whereby a container can be dumped and returned to its upright position solely by means of mechanical means, i.e. without the requirement of motor or an outside power source.

Another object of the invention is the provision of an improved gravity actuated clamping and dumping mechanism which is adapted to securely grasp a container, reliably retain the container in its upright position while it is being transported and is capable of allowing the container to be turned through an arc of 180° whereby the contents can be reliably removed.

2

Another object of the invention is the provision of an improved transporting and dumping mechanism of the type described that can be supported on the forwardly extending tines of a fork lift truck.

Another object of the invention is the provision of an improved fork clamp of the type described wherein a means is provided for assisting the jaws in the last portion of their movement toward the dumping position and in returning the load to the upright position after the load has been dumped to thereby force the clamp assembly into engagement with the latch with sufficient momentum to be engaged thereby.

Another object of the invention is the provision of an improved clamping and dumping mechanism of the type described wherein the speed with which the load is dumped is maintained within prescribed limits.

A further object of the invention is the provision of an improved dumping mechanism having a pair of clamping jaws that are capable of moving toward or away from one another along a laterally extending horizontally disposed path between the jaws whereby forward portions of the jaws will remain substantially aligned with the fore and aft axis of the apparatus as the jaws are moved between their open and closed positions.

These and other more detailed and specific objects will be apparent in view of the following specification and drawings wherein.

Figure 1:
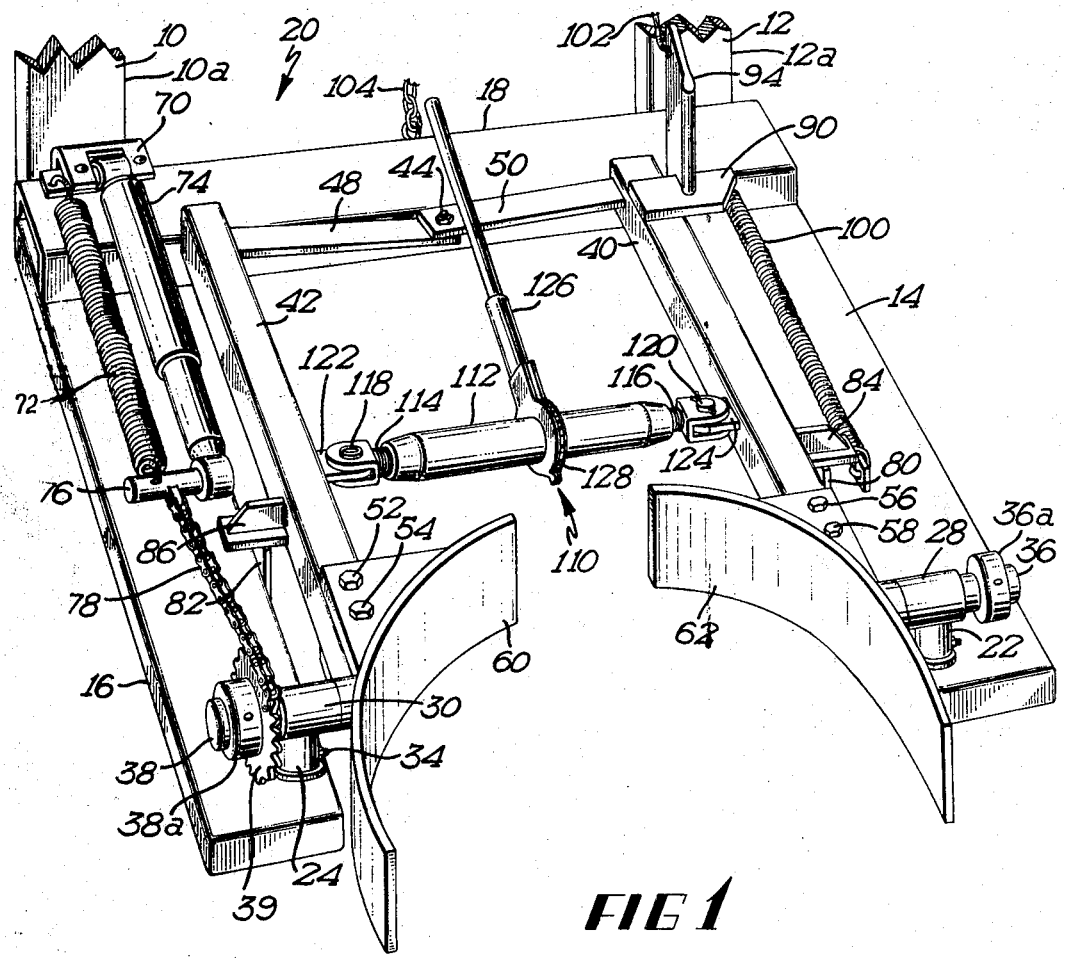
FIGURE 1 is a perspective view of an apparatus embodying the invention.

Briefly, in accordance with the present invention, a supporting framework is provided upon which a pair of clamp arms are mounted. The supporting framework is adapted to be engaged upon the forks of a lift truck of conventional construction. To this end the supporting framework includes hollow members adapted to slide over the tines of the fork. At the forward end of the framework horizontally disposed laterally extending pivots are provided and it is by means of these pivots that the clamp jaws are secured to the supporting framework. Arms are provided on the jaws. A latch is provided for normally retaining the jaws in their upright position and a spring is operatively associated with the arms for returning the arms from a dumping position to an upright position.

Referring now to the figures there is shown a pair of lift truck forks 10 and 12 having vertical portions 10a and 12a and horizontal portions 10b and 12b. These forks are entirely conventional and are mounted on the fork lift truck (not shown) in the usual manner. Slidably supported over the horizontal portions 10b and 12b are square tubes 14 and 16 which together with a cross piece 18 suitably affixed as by welding to the rearward ends of the tubes 14 and 16 comprise a framework for the dumping apparatus which is designated by the numeral 20.

Figure 2:
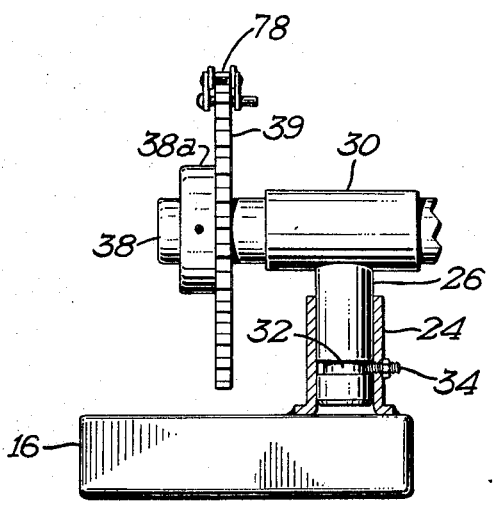
FIGURE 2 is an enlarged front elevational view of the right hand supporting pivot on a somewhat larger scale compared with FIGURE 1.

Suitably affixed as by welding to the forward ends of the tubes 14 and 16 are suitable supports comprising vertically extending tubes 22 and 24. Within each is provided pivot mounting tubes 26, one of which is shown in detail in FIGURE 2. The journals 28 and 30 are rigidly secured to the tubes 26 as by welding. As seen in FIGURE 2, each of the supporting tubes 26 is provided with an annular horizontally disposed groove 32 within which is seated the end of a bolt 34 that permits the tubes 26 and the corresponding journals 28 and 30 to articulate about vertical axes. Extending through and mounted for rotation within the journals 28 and 30 are pivot shafts 36 and 38 respectively, each of which is rigidly connected as by welding at its inward or central end to one of the clamp arms 40 and 42. To the free ends of the shafts 36 and 38 are secured stops 36a and 38a. Rigidly secured to the shaft 38 is a sprocket 39. The arms are positioned generally parallel to one another and normally extend in a generally horizontal plane along the fore and aft axis of the apparatus.

Figure 3:
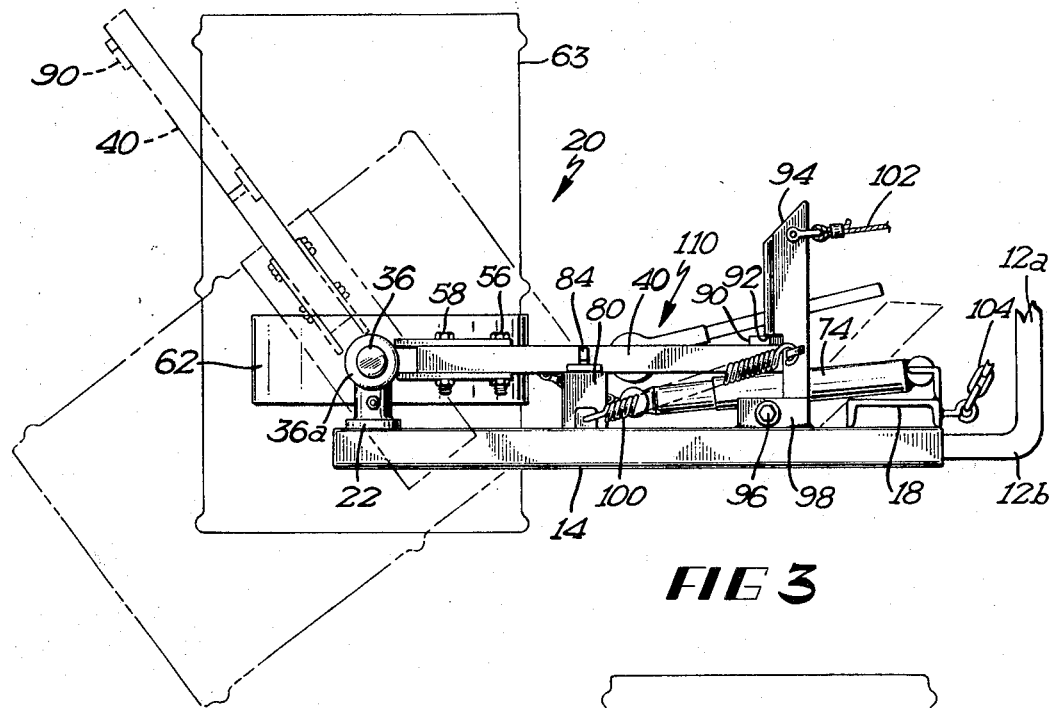
FIGURE 3 is a side elevational view of the apparatus as seen from its left side.

The arms 40 and 42 are pivotally connected for swinging movement relative to one another about a vertical axis by means of a pivot 44 located intermediate the rearward ends of the arms. A pair of centrally extending connecting bars 50 and 48 project centrally from the rearward ends of the arms and are joined by the pivot 44. On the forward ends of the arms are fastened by bolts 52, 54, 56 and 58 a pair of curved jaws 60 and 62. The jaws in this instance are curved to form segments of a circle. This configuration is preferred in connection with the transporting and dumping of material from fiber or steel drums. Of course, when containers of other shapes are employed the jaws should have the proper shape to fit them. The jaws are suitably shaped to support the load shown, for example as a steel drum indicated at 63 such that the center of gravity of the drum is located slightly ahead or forwardly (e.g. .2 to 10 inches) of the transverse pivot axis extending between the pivots 28 and 30. Accordingly, a load within the jaws will exert a torque in a counterclockwise direction about the pivot shafts 36 and 38 as seen in FIGURE 3.

Figure 4:
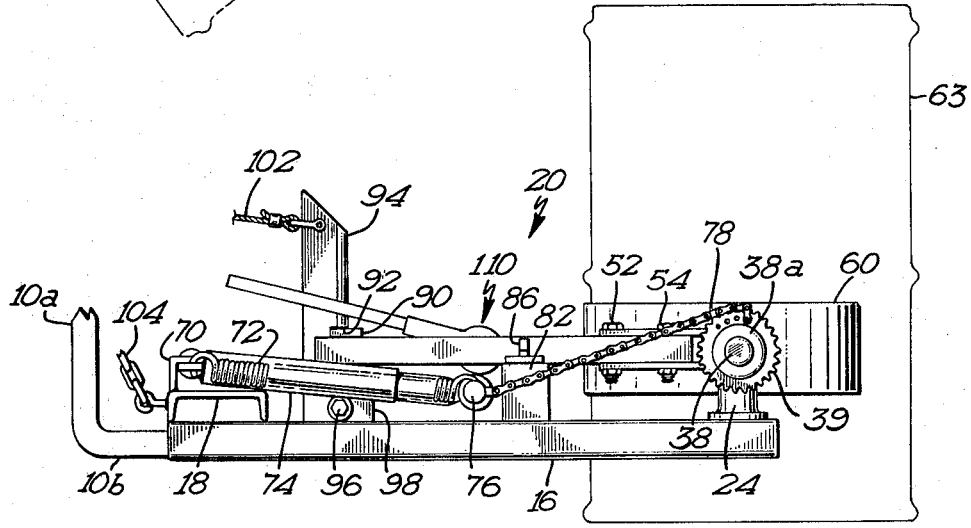
FIGURE 4 is a side elevational view of the apparatus as seen from the right side.

As seen in FIGURES 1 and 4 a bracket 70 is rigidly secured to the cross member 18. Extending forwardly from the bracket 70 is a resilient element such as helical spring 72 and a cushioning means consisting of a dashpot 74. Their forward ends are rigidly secured to a rod 76. Between the rod 76 and the top of the sprocket 39 is secured a flexible connecting member 78, in this instance a roller chain. The chain is thus appropriately arranged on the sprocket so that the forward tilting movement of the jaws (i.e. rotation in a counterclockwise direction as seen in FIGURE 3) will cause the chain to wrap about the sprocket 39 thereby elongating the spring 72 and extending the dashpot 74.

While dashpots of various types can be employed, it is preferred that the dashpot 74 be constructed appropriately to permit contraction at any speed but allowing extension thereof at a predetermined and controlled speed. Since many dashpots of this type are available, no further description will be given herein.

Supporting plates 80 and 82 are rigidly secured to the frame elements 14 and 16. Located in vertical alignment with these plates and rigidly secured to the arms 40 and 42 respectively are stops 84 and 86 for the purpose of limiting the downward movement of the rearward ends of the arms thereby normally maintaining the arms and jaws in a horizontal position.

Rigidly secured to the rearward end of the arm 40 and extending laterally therefrom is a latch engaging plate 90 which is normally located beneath and engaged by a locking surface 92 of a latch 94 which is itself pivotally secured at its lower end by pin 96 to a plate 98 welded to the upper surface of the tube 14. A resilient member such as a spring 100 is secured between the framework, specifically between tube 14 and the latch 94 to yieldably bias the upward end of the latch forwardly. A lanyard or other operating means 102 is secured to the upward end of the latch for swinging its upward end rearwardly to a position shown in dotted lines in FIGURE 3 when the latch is to be disengaged from plate 90.

It is generally desirable to fasten the framework of the apparatus to the lift truck. This can be conveniently done with a chain, a portion of which is shown at 104.

It should be noted that the arms 40 and 42 extend rearwardly a substantial distance from the pivots defined by journals 28 and 30. The jaws thus move along a substantially lateral path when opening and closing. This enables them to enter easily between closely stacked drums since their forward ends are aligned with the fore and aft axis of the apparatus.

The weight of the arms is preferably of a determined value. I have obtained good results with arms having a a weight on the order of between 20 and 60 pounds and preferably about 40 pounds.

The clamp arm actuating asembly is indicated generally at 110 in FIGURE 1. It consists of a turnbuckle threaded on studs 114 and 116 connected by means of vertical pivots 118 and 120 to brackets 122 and 124. The brackets are in turn welded to the arms 42 and 40 respectively. A handle 126 is connected to the turnbuckle 112 by means of a one-way clutch arrangement 128 having a control lever (not shown) for changing the direction in which the movement of lever 126 will turn the turnbuckle 112. The jaw actuating assembly 110 is available commercially. Any other suitable mechanical actuating assembly of well-known construction can be used for drawing the arms together and for moving them apart provided it is capable of applying the requisite force and will reliably maintain the arms in a fixed position when set.

The operation of the apparatus will now be described. The framework composed of tubes 14 and 16 and the cross piece 18 is mounted upon the forks 10 and 12 by inserting the forks within the tubes as seen in FIGURES 2 and 3. The ratchet mechanism 128 is then properly set and a lever 126 pushed forwardly and rearwardly to force the jaws 60 and 62 together against the sides of the container that is to be lifted. The latch 94 will then be in the solid line position of FIGURE 3. In this manner the container 63 is gripped securely between the jaws 60 and 62. The forks 10 and 12 of the lift truck are then elevated enough to lift the container 63 slightly above the floor. It is then transported to the desired location. When the lanyard 102 is pulled, the upper end of the latch 94 will swing to the rear. This, of course, releases the latch engaging plate 90. Because the center of gravity of the container 63 is located forwardly of the axis of the pivot shafts 36 and 38, the container 63 will begin to tip forwardly. Initially, the weight of the arms 40 and 42 will tend to partially counterbalance the load. As the load tilts the spring 72 and the dashpot 74 will be extended and the chain 78 will wrap around sprocket 39. After the arms 40 and 42 have reached a vertical position, their weight will tend to augment that of the load thereby assisting the weight of the load in maintaining the container 63 in an inverted or dumping position. In this way, although the contents of the container may in some cases pour out rather slowly, the weight of the arms 40 and 42 when on the forward side of the pivot pins 36 and 38 will help to remove the last portion of the load from the container although the load by itself does not have sufficient weight to maintain the container 63 in an inverted position.

After the contents of the container 63 have been emptied, the tension exerted by spring 72 on chain 78 will slowly return the clamp arms and the container 63 to its upright position. During the last stages of the righting operation, the weight of the arms 40 and 42 will help to return the container 63 to its upright position with enough force to displace the latch member 94 to the dotted line position as seen in FIGURE 3 until the plate is again beneath the latch engaging surface 92.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A gravity actuated self-righting dumping apparatus for containers comprising in combination a supporting framework having font and rear portions, a pair of clamping jaws mounted for pivotal movement along the framework along a horizontally disposed lateral pivot axis said jaws having a predetermined shape that will position the center of gravity of the container out of alignment with respect to said lateral pivot axis so that the container will be off balance and thereby tip about said pivot axis if unrestrained, a releasable jaw restraining means, a jaw actuating assembly operatively associated with the jaws for moving the jaws towards one another to engage the jaws upon the container and for moving the jaws apart when the container is to be released, a resilient element connected between the framework and the jaws for normally biasing the rotational position of jaws about the lateral pivot axis such that the jaws are located in a position adapted to support the container in an upright attitude when the container is secured between the jaws and said releasable restraining means is operatively connected to the jaws for normally maintaining the jaws in said position, the release of the restraining means causing the jaws to be free to tip about said lateral pivot axis whereby the top of the container will tilt in one direction under the influence of gravity and swing downwardly about said lateral pivot axis thereby dumping the contents out of the container and the resilient element then being adapted to rotate the jaws about the lateral axis in the reverse direction to return said jaws to their original position and the container to its upright attitude.

2. The apparatus of claim 1 wherein the jaws are mounted at the forward end of elongated arms, said arms extending rearwardly from the jaws in a horizontal plane when the jaws are positioned in said position and pivot means connecting the rearward ends of the arms at a point located intermediate the rearward ends of the arms.

3. The apparatus of claim 2 wherein the restraining means is a latch operatively associated with the rearward end of a pair of arms that extend rearwardly from the jaws.

4. The apparatus of claim 2 wherein the arms have a predetermined weight that is comparable in magnitude to the weight of said container and the jaws whereby the weight of the arms helps to turn the jaws forwardly about said lateral axis when the arms have passed a position located immediately above the lateral axis.

5. The apparatus of claim 1 wherein a damping means is operatively associated between the jaws and the framework for limiting the speed of rotation of the jaws about the lateral axis in a direction wherein the top of the container swings forwardly when the latch is released.

6. The apparatus of claim 1 wherein the pivotal mounting of the jaws upon the framework compreses journals mounted for articulation on vertical axes located at the forward end of the framework, the journals being bored horizontally, a horizontally disposed laterally extending shaft in each of the bores, the inward end of each shaft being rigidly connected to the outward surface of the adjacent jaw.

7. The apparatus of claim 6 wherein arms extend rearwardly from the jaws and pivotally connected to each other at their rearward ends whereby the jaws move in an arc with the pivotal connection between the rearward end of the arm at its center when the jaw actuating assembly is operated.

8. The apparatus of claim 7 wherein a damping means is connected between the jaws and the framework for limiting the speed of rotation of the jaws about the lateral axis, said position in the direction toward the dumping position.

9. The apparatus according to claim 8 wherein the damping means comprises a dashpot constructed to limit the speed with which the jaws tilt forwardly about a lateral pivot axis.

10. The apparatus of claim 1 wherein pivot shafts extend laterally from the jaws, a sprocket is mounted upon one of the shafts and a chain is connected between the top of the sprocket and the resilient member, rotation of the shafts and jaws will wrap the chain about the sprocket thereby elongating the resilient member as the jaws tilt forwardly about the lateral axis whereby the top of the container is tilted forwardly against the force of the resilient member when the latch is released.

References Cited

UNITED STATES PATENTS

| | | | |
|---|---|---|---|
| 2,267,355 | 12/1941 | Van Riper | 214—313 |
| 2,652,140 | 9/1953 | Hall | 214—1 X |
| 3,206,052 | 9/1965 | Kennedy. | |
| 3,225,947 | 12/1965 | Anderson | 214—314 X |
| 3,319,815 | 5/1967 | Vik | 214—620 |

GERALD M. FORLENZA, Primary Examiner

R. J. SPAR, Assistant Examiner

U.S. Cl. X.R.

214—313, 652